(12) United States Patent
Fukuda

(10) Patent No.: US 8,301,816 B2
(45) Date of Patent: Oct. 30, 2012

(54) MEMORY ACCESS CONTROLLER, SYSTEM, AND METHOD

(75) Inventor: Yohsuke Fukuda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 401 days.

(21) Appl. No.: 12/628,633

(22) Filed: Dec. 1, 2009

(65) Prior Publication Data
US 2010/0138578 A1 Jun. 3, 2010

(30) Foreign Application Priority Data

Dec. 1, 2008 (JP) .................................. 2008-306025

(51) Int. Cl.
*G06F 13/00* (2006.01)
*G06F 12/00* (2006.01)
(52) U.S. Cl. ......... 710/110; 711/150; 711/151; 711/154
(58) Field of Classification Search .................. 710/110, 710/113; 711/100, 147, 150, 151, 154
See application file for complete search history.

(56) References Cited

U.S. PATENT DOCUMENTS

| 6,970,978 B1 * | 11/2005 | Wu ............................... 711/137 |
| 2008/0189479 A1 * | 8/2008 | Cope et al. .................... 711/104 |
| 2010/0077140 A1 * | 3/2010 | Abraham et al. ............. 711/106 |

FOREIGN PATENT DOCUMENTS

| JP | 2006-127408 A | 5/2006 |
| JP | 2008-146330 A | 6/2008 |
| JP | 2008-165485 A | 7/2008 |
| JP | 2008-225981 A | 9/2008 |

* cited by examiner

*Primary Examiner* — Glenn A Auve
(74) *Attorney, Agent, or Firm* — Dickstein Shapiro LLP

(57) ABSTRACT

A memory access controller including a command analysis unit to receive write access request and command data and to analyze access to a memory, a command execution unit to output command and data control signals to the memory based on write data, and the analysis result, a mode setting unit to switch between a first operation mode in which a write access request is issued when both the command data and the corresponding write data are available, and a second operation mode in which a write access request is issued when the command data is available independently of availability of the write data corresponding to the command data, and a timing arbitration unit provided for each bus master to output the write access request and command data to the command analysis unit and output the write data to the command execution unit in accordance with the mode setting unit.

6 Claims, 4 Drawing Sheets

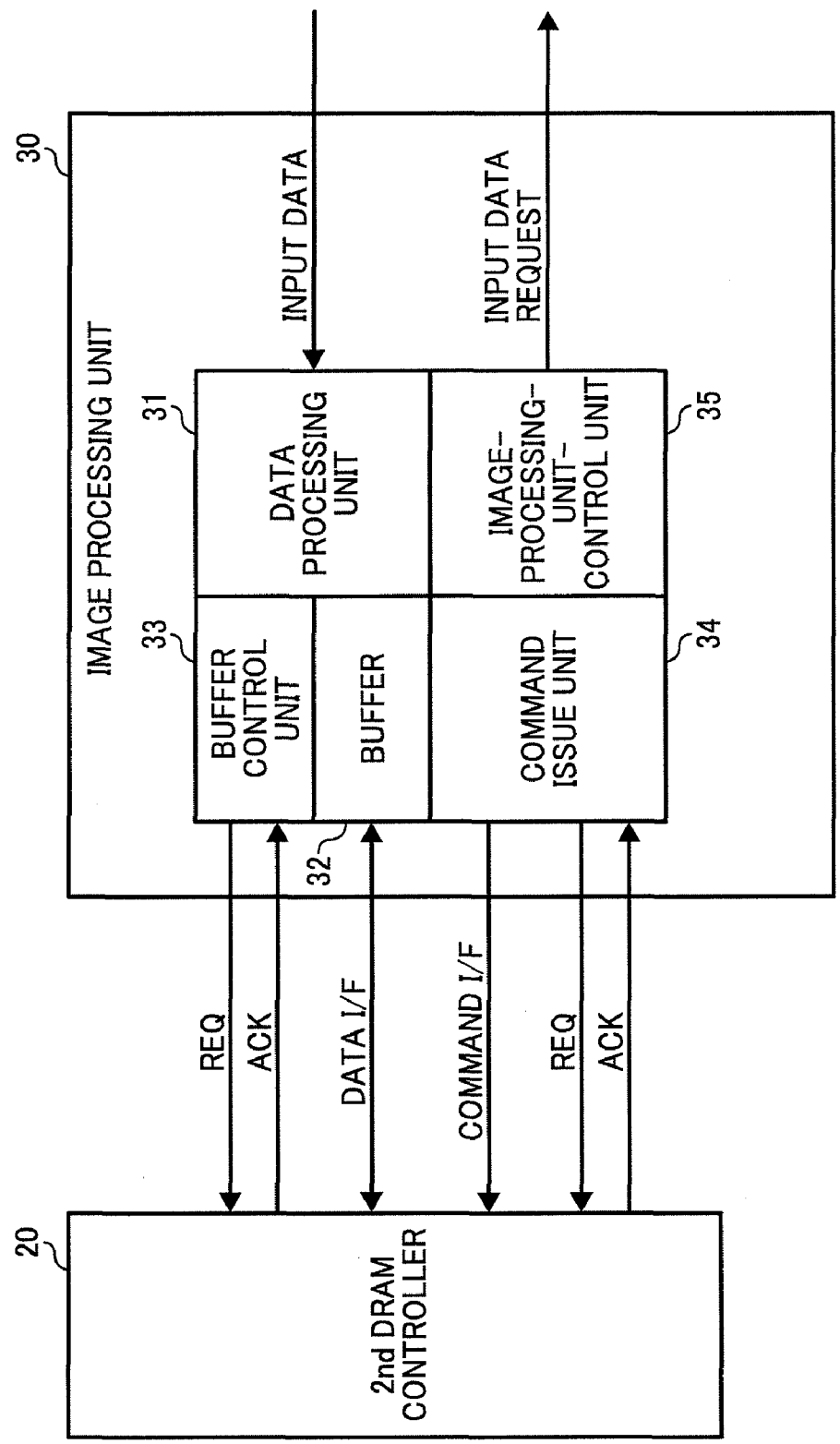

MEMORY ACCESS CONTROLLER, SYSTEM, AND METHOD

CROSS-REFERENCE TO RELATED APPLICATIONS

This patent application is based on and claims priority from Japanese Patent Application No. 2008-306025, filed on Dec. 1, 2008 in the Japan Patent Office, which is hereby incorporated by reference herein in its entirety.

BACKGROUND

1. Field of the Invention

The present invention relates to a memory access controller used in portable devices, such as mobile phones, digital cameras, and so on, and more specifically, to a memory access controller having high data transmission efficiency.

2. Description of the Related Art

There is increasing demand for portable devices, such as mobile phones, video cameras, digital cameras, and so on. Such devices perform a variety of types of data processing, achieved by large-scale integration (LSI) circuits (hereinafter simply "LSIs"). For example, video cameras and digital cameras include specific LSIs that process image data captured from an image sensor of the digital camera. Further, mobile phones and other such portable devices include other specific LSIs that process audio data in different ways. Such LSIs that perform complex processing of large volumes of data are required to have high throughput in data transmission to an attached storage device such as a memory. To satisfy such requirements, a variety of related technologies have been researched and developed.

JP-2008-165485-A proposes a semiconductor device to perform data transmission on data stored in a buffer efficiently. The semiconductor device includes a data processing unit for processing a plurality of data, a buffer for temporarily storing and burst-transferring the data processed by the data processing unit, and a buffer control unit for causing the buffer to burst-transfer the stored data. The buffer control unit causes the buffer to start the burst transfer so that data to be stored in the buffer from the data processing unit will not be replaced before a data amount to be transferred in a single burst transfer is stored in the buffer.

However, this semiconductor device is intended simply to improve efficiency of data transmission from the buffer to an arbitration circuit without considering processing performed in a memory controller to which the data is transmitted.

JP-2006-127408-A proposes another data transmission system. The data transmission system includes a plurality of masters, a memory controller, and a bus arbiter. The memory controller controls an external memory. The bus arbiter arbitrates bus use requests from the bus masters.

The memory controller notifies each bus master of bus use recommendation information, and each bus master issues a bus use request to the bus arbiter based on the bus use recommendation information reported from the memory controller.

FIG. 1 is a block diagram of a DRAM controller 100 which a plurality of bus masters 301, 302, and 303 access. A command I/F is connected to the DRAM controller 100 to input data such as address read/write through the command I/F to a DRAM 200 from the bus masters 301, 302, and 303. Further, a data I/F is connected to the DRAM controller 100 to input data such as write data through the data I/F. Furthermore, the DRAM controller 100 includes a command analysis unit 101 and a command execution unit 102. The command analysis unit 101 determines command input data to be issued to the DRAM 200 based on the input data from the command I/F representing read, write, number of accesses, and address. The command execution unit 102 receives the command input data analyzed by the command analysis unit 101 and data input through the data I/F and controls timing for outputting a command control signal and a data control signal to the DRAM 200. The DRAM 200 is a memory which can perform burst-transferring, for example, a Synchronous Dynamic Random Access Memory (SDRAM), a Double-Data-Rate (DDR)-SDRAM, or the like.

In the DRAM controller 100, a latency between when the data is input through the command I/F and when the data is output to the DRAM 200 as the command control signal is larger than a latency between when the data is input through the data I/F and when the data is output to the DRAM 200 as the data control signal. This is because more jobs are performed on the data input through the command I/F than the data input through the data I/F, for example, analyzing signals input from the command I/F and generating a plurality of commands, or determining processing by read/write.

Accordingly, even when the data are input to the command I/F and the data I/F at the same time, it is not possible to output the data input from the data I/F to the DRAM 200 as the data control signal for the DRAM 200 until data transmission for the data input from the command I/F is completed. Further, it is not possible for the DRAM controller 100 to access the DRAM 200. As a result, transmission efficiency between the DRAM controller 100 and the DRAM 200 is decreased.

In the system shown in FIG. 1, the plurality of bus masters 301, 302, and 303 is connected to the DRAM controller 100 through a command I/F and a data I/F. Accordingly, one bus master occupies a bus for the command I/F and a bus for the data I/F. For example, when the bus master 301 issues a write request to the DRAM controller 100 through the command I/F, the other bus masters 302 and 303 cannot send a write request to the DRAM controller 100 until completion of the data input through the data I/F.

Thus, during such a large latency between when a bus master issues a write request and when preparation of data to be input to the data I/F is finished as described above, the command I/F and the data I/F are occupied. Accordingly, the other bus masters cannot send a write request, and consequently, transmission efficiency of the DRAM controller 100 for the DRAM 200 is decreased.

SUMMARY

This patent specification describes a novel memory access controller that includes a command analysis unit to receive write access requests and command data and to analyze access to a memory, a command execution unit to output commands and data control signals to the memory based on write data and the analysis result provided by the command analysis unit, a mode setting unit to switch between a first operation mode in which a write access request is issued when both the command data and the corresponding write data are available and a second operation mode in which a write access request is issued when the command data is available independently of availability of the write data corresponding to the command data, and a timing arbitration unit provided for each bus master to output the write access request and command data to the command analysis unit and output the write data to the command execution unit in accordance with the mode setting unit.

This patent specification further describes a novel method of controlling memory that includes receiving write access request for a memory and command data from a plurality of bus masters, analyzing access to a memory based on the command data, and outputting a command control signal and a data control signal to the memory based on write data input from the plurality of bus masters and the analysis result provided by the command analysis unit.

The operation mode is switched between a first operation mode in which a write access request from a bus master is issued to the memory control unit when both the command data and the corresponding write data are available and a second operation mode in which a write access request from a bus master is issued to the memory control unit when the command data is available independently of availability of the write data corresponding to the command data.

The write access request from the bus master, the command data, and the write data are output to the command execution unit with a timing set by the mode setting unit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a block diagram illustrating the detailed structure of an image processing unit of FIG. 2.

DETAILED DESCRIPTION OF EXEMPLARY EMBODIMENTS

Figure 1:
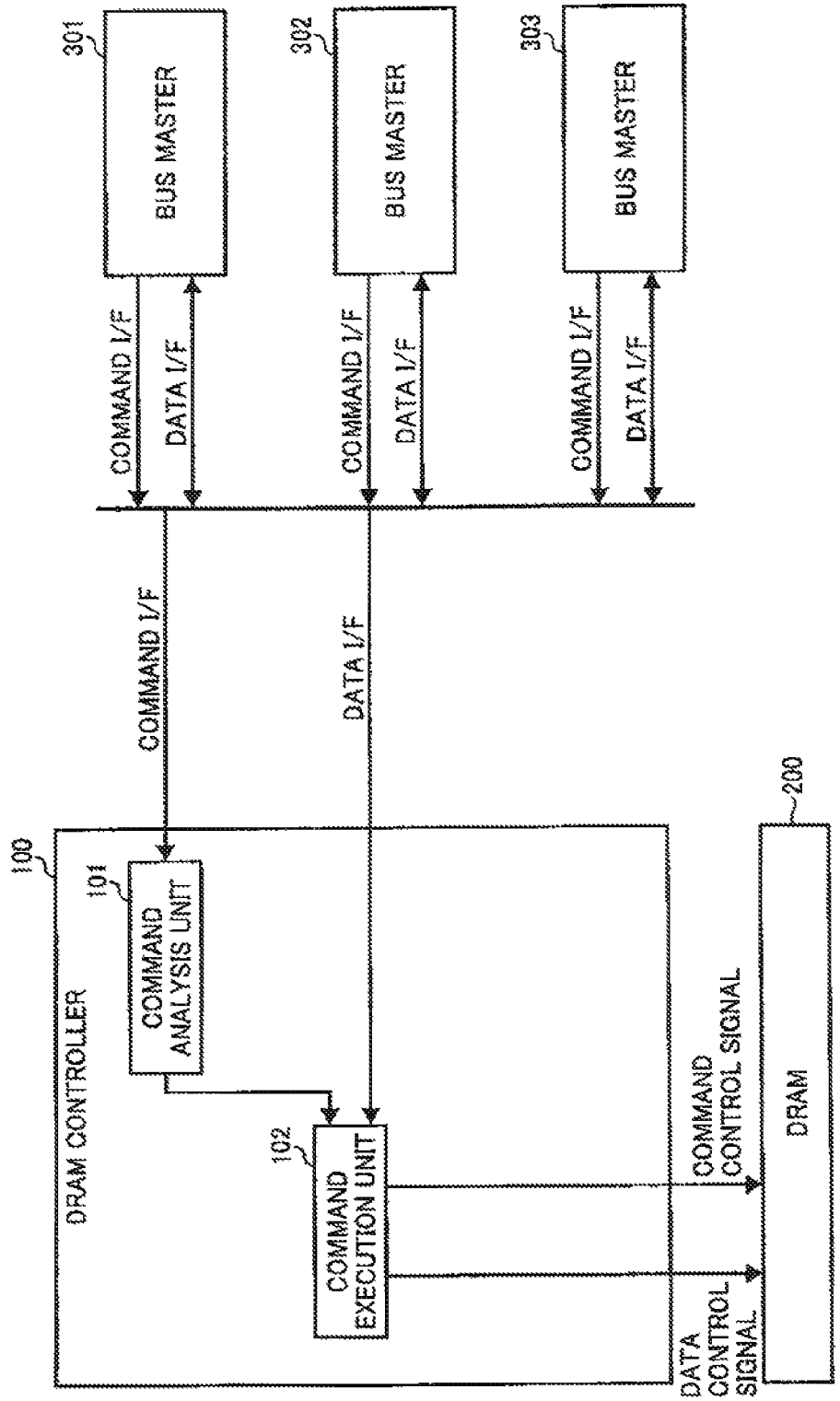
FIG. 1 is a block diagram of a conventional DRAM controller.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, a description is given of an illustrative embodiment.

Figure 2:
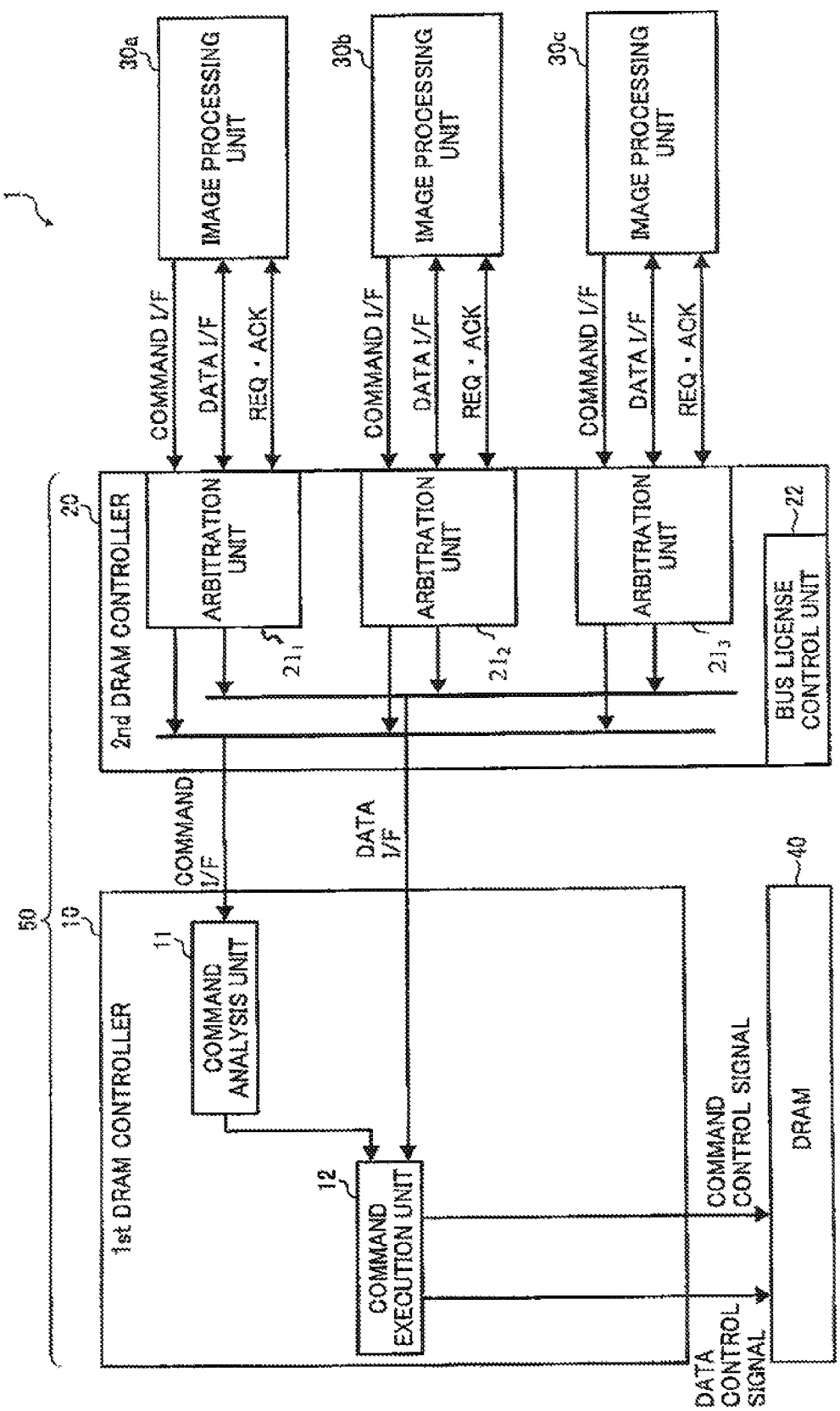
FIG. 2 is a block diagram illustrating an image processing system that includes a memory access control device according to an illustrative embodiment of the present invention.
Figure 3:
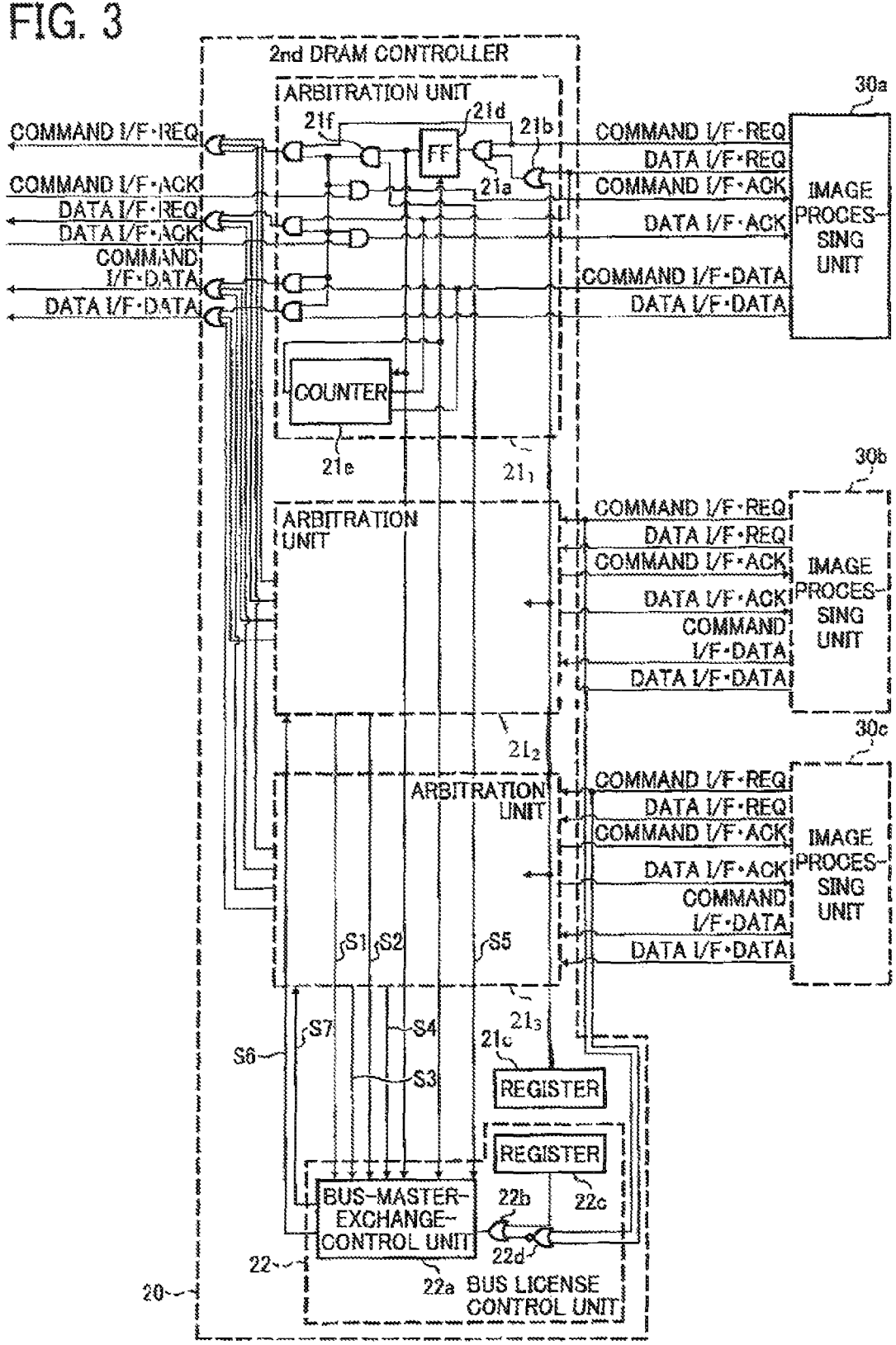
FIG. 3 is an example circuit diagram illustrating a detailed structure of a second DRAM controller of FIG. 2.

Referring to FIGS. 2, 3, and 4, an illustrative embodiment of the present invention will be described.

FIG. 2 is a block diagram illustrating an image processing system 1 that includes a memory access control device. FIG. 3 is an example circuit diagram illustrating a detailed structure of a second Dynamic Random Access Memory (DRAM) controller shown in FIG. 2. FIG. 4 is a block diagram illustrating the detailed structure of an image processing unit shown in FIG. 2.

The image processing system 1 shown in FIG. 2 includes a first DRAM controller 10, a second DRAM controller 20, image processing units 30a, 30b, and 30c (referred to as image processing unit 30 when considering any given one of the image processing units 30a, 30b, and 30c), and a DRAM 40. The first and second DRAM controllers 10 and 20 form a memory access control device 50.

The first DRAM controller 10 includes a command analysis unit 11 and a command execution unit 12. The command analysis unit 11 processes command data input through a command I/F (interface) from the second DRAM controller 20 which will be described later in detail. The command execution unit 12 processes data input from the command analysis unit 11 together with write data input through a data I/F from the second DRAM controller 20.

More specifically, the command analysis unit 11 analyzes the command data input through the command I/F from the second DRAM controller 20. Further, the command analysis unit 11 determines an access control procedure for the DRAM 40 based on the read command, write command, number of data accesses, and address, and outputs the access control procedure to the command execution unit 12. The access control procedure is a command for the DRAM 40 and may include a "refresh" process to ensure the performance of the DRAM 40. Such "refresh" process may be inserted automatically by the command analysis unit 11.

It is necessary to have some latency to perform the "refresh" process. More specifically, the latency is a time period lasting from when the command analysis unit 11 analyzes the command data until when the command analysis unit 11 outputs a command to the command execution unit 12. Accordingly, the latency increases proportionally with an increase in an internal operating frequency of the first DRAM controller 10 or the complexity of command data to be analyzed.

The command execution unit 12 receives the command data, which is sent from the second DRAM controller 20 through the command analysis unit 11 and includes the latency, and write data input from the second DRAM controller 20. The command execution unit 12 outputs a command control signal and a data control signal to the DRAM 40. The command control signal includes address, read command, write command, and chip-select command. The data control signal includes the write data.

When a write operation for the DRAM 40 is performed, the command execution unit 12 does not output the command control signal and the data control signal to the DRAM 40 if the command data input from the command analysis unit 11 and the write data input from the second DRAM controller 20 are not available at the same time. If the command data and the write data are not available, the command execution unit 12 waits to output the control signals until the command data and the write data become available. As for the read operation from the DRAM 40, the DRAM 40 can output the data when the command data is received from the command analysis unit 11. Further, the command execution unit 12 may have a unit that determines a following command control signal to be output based on the command control signal output previously. For example, when the same bank in the DRAM 40 is accessed, a next command may be issued omitting a command for a period for pre-charge.

As shown in FIG. 2, the second DRAM controller 20 is connected to a plurality of image processing units 30a, 30b, and 30c through command I/Fs and data I/Fs, and is connected to the first DRAM controller 10 through a command I/F and a data I/F.

A signal through the command I/F includes a command I/F-REQ signal representing a request for the command I/F, a command I/F-data signal representing information such as read, write, number of accesses, and address, and a command I/F-ACK signal representing an acknowledgement t that the other end receives the command I/F-REQ signal. A signal through the data I/F includes a data I/F-REQ signal representing a request for the data I/F, a data I/F-data signal representing write data, and a command I/F-ACK signal representing an acknowledgement that the other end receives the data I/F-REQ signal.

Communication using the command I/F and the data I/F is performed in the following way. The image processing unit 30 sends a command I/F data signal when the image processing unit 30 sets the command I/F-REQ signal "1", and sets the command I/F-REQ signal "0" when the image processing unit 30 receives "1" level of the command I/F-ACK signal. The image processing unit 30 sends a data I/F-data signal when the image processing unit 30 sets the data I/F-REQ signal "1", and sets the data I/F-REQ signal "0" when the image processing unit 30 receives "1" level of the data I/F-ACK signal.

The first DRAM controller 10 captures the command I/F-data signal when the first DRAM controller 10 receives the command I/F-REQ signal, and returns the command I/F-ACK signal. Similarly, the first DRAM controller 10 captures the data I/F-data signal when the first DRAM controller 10 receives the data I/F-REQ signal, and returns the data I/F-ACK signal.

Further, considering operation of the second DRAM controller 20 using the above described communication protocol, the operation proceeds as follows.

The second DRAM controller 20 receives data input through the command I/F from that image processing unit 30 of the plurality of image processing units 30a, 30b, and 30c from which a command I/F-REQ signal is received and outputs the REQ signal and the data (command data) to the first DRAM controller 10. Further, when the ACK signal representing an acknowledgement that the first DRAM controller 10 receives the REQ signal and the data, the second DRAM controller 20 outputs the ACK signal to the image processing unit 30 which sent the REQ signal.

Next, after the image processing unit 30 receives the command I/F-ACK signal and the data I/F-ACK signal, the image processing unit 30 cancels the command I/F-REQ signal and the data I/F-REQ signal, and outputs the data I/F-REQ signal and data (write data). The second DRAM controller 20 outputs the data I/F-REQ signal and the data to the first DRAM controller 10. When the second DRAM controller 20 receives an ACK signal representing an acknowledgement that the first DRAM controller 10 receives the REQ signal and the data from the first DRAM controller 10, the second DRAM controller 20 outputs the ACK signal to the image processing unit 30 which outputs the REQ signal.

This communication protocol for data I/F is performed repeatedly a number of times, the number representing the number of accesses included in the information in the command I/F data output initially. The image processing unit 30 receives the same number of the data I/F-ACK signals as the above number of accesses.

The second DRAM controller 20 includes a respective arbitration unit $21_1$, $21_2$, $21_3$ (referred to generally as "arbitration unit 21") for each of the image processing units 30a, 30b, and 30c. When the second DRAM controller 20 sends the data input through the data I/F and the data input through the command I/F connected to the image processing unit 30 to the first DRAM controller 10, the arbitration unit 21 switches its operation mode between first and second operation modes for outputting the incoming data.

In the first operation mode, the arbitration unit 21 opts not to output the input data until the data from the data I/F and the command I/F both are received, so that the second DRAM controller 20 sends the input data to the first DRAM controller 10 when the data from the command I/F and the data from the data I/F are both available.

In the second operation mode, the arbitration unit 21 outputs the data from the data I/F immediately upon receipt from the data I/F, and subsequently outputs the data from the corresponding command I/F as it is received from the command I/F.

As described above, a respective arbitration unit $21_1$, $21_2$, $21_3$ is provided for each of the plurality of the image processing units 30a, 30b, and 30c. The arbitration unit 21 may include a register to perform the above-described switching operation. The switching operation may be controlled by other functional blocks than the register, or by settings of communicably connected external terminals.

Further, as for the first operation mode in which the data are output to the first DRAM controller 10 when the data of a command I/F and a data I/F are both available, the data input from a command I/F and a data I/F of a second image processing unit 30 are output to the first DRAM controller 10 when the data are input from a command I/F and a data I/F of a first image processing unit 30 while the image processing unit 30 is preparing both sets of data.

The second DRAM controller 20 includes a bus license control unit 22 that switches the command I/F REQ signals. In other words, the bus license control unit 22 determines which image processing unit has priority to output the REQ signal, based on the time measured in the bus license control unit 22. For example, the bus license control unit 22 may determine to output the command I/F-REQ signal input from the image processing unit 30a prior to the command I/F-REQ signals input from the other image processing units 30b and 30c.

FIG. 3 is an example circuit diagram of the arbitration unit 21 and the bus license control unit 22 in the second DRAM controller 20.

The arbitration unit $21_1$ receives the command I/F-REQ signal from the image processing unit 30a. Then, the command I/F-REQ signal arrives at one input terminal of an AND gate 21a in the arbitration $21_1$. Another input terminal of an AND gate 21a is connected to an output terminal of an OR gate 21b. Accordingly, an output level of the OR gate 21b is determined by a value of the data I/F-REQ signal of the image processing unit 30a and a setting value of a register 21c that is a mode setting unit. When the output value of the register 21c is "0", the output value of the OR gate 21b remains "0" until the data I/F-REQ signal is received. When the output value of the register 21c is "1", the output value of the OR gate 21b becomes "1" independently of the data I/F-REQ signal. Further, the output value of the AND gate 21a becomes "1" immediately when the command I/F-REQ signal is received.

The AND gate 21a and the OR gate 21b are provided for each corresponding bus master and form a timing arbitration unit so that a write access request from the bus master and the command data are output to the analysis unit and write data is output to the command execution unit with a timing set by a timing determined by the mode setting unit or register 21c.

Accordingly, it becomes possible to switch the operation mode between the first operation mode in which the command I/F-REQ signal is output to the first DRAM controller 10 when both the data of the command I/F and the data of the data I/F are available and the second operation mode in which the command I/F-REQ signal is output to the first DRAM controller 10 immediately when the command data from the command I/F becomes available.

More specifically, it is possible to switch the operation mode between the first operation mode in which a write access request from a bus master is issued to a memory control unit when both the command data and the corresponding write data which pairs up with the command data are available, and the second operation mode in which a write access request from a bus master is issued to a memory control unit when the command data becomes available, independently of the availability of the write data that pairs up with the corresponding command data.

One register 21c is provided in the second DRAM controller 20 and is used in common by each arbitration unit 21. The register 21c can be set freely depending on the type of processing to be performed in this embodiment.

For example, when it is expected that all the image processing units 30a, 30b, and 30c access the memory, the output value of the register 21c is set to "0", thereby entering the first operation mode. When it is expected that one specific image processing unit 30 accesses the memory successively, the output value of the register 21c is set to "1", thereby entering the second operation mode. This switching operation may be set automatically so as to support the purpose of the particular processing.

When an input value from the AND gate 21a is "1", a flipflop 21d keeps outputting "1". The flipflop 21d is initialized to "0" when an input value from a counter 21e that is described later is "1". More specifically, under a condition where the output value of the register 21c is "1", the flipflop 21d outputs "1" when the command I/F-REQ signal is "1". Where the output value of the register 21c is "0", the flipflop 21d outputs "1" when both the command I/F-REQ signal and the data I/F-REQ signal are "1".

The counter 21e captures and holds the data of the command I/F data when the command I/F-REQ signal is "1". As described previously, the second DRAM controller 20 receives the command I/F-ACK signal and the data I/F-ACK signal from the first DRAM controller 10 after the command I/F-REQ signal and the data of the command I/F-data are output, and outputs the command I/F-ACK signal and the data I/F-ACK signal received as a command I/F-ACK signal and a data I/F-ACK signal for the image processing unit 30a. While the flipflop 21d is outputting "1", the counter 21e counts up each time the data I/F-REQ signal changes from "0" to "1". The counter 21e compares the counted number with a predetermined number accesses stored in advance. When the counted number matches the predetermined number of accesses, the counter 21e is cleared and outputs "1". When the counter 21e outputs "1", the output of the flipflop 21d becomes "0", and an output signal of a bus-master-exchange-control unit 22a output to the arbitration unit $21_1$ becomes "0". The bus-master-exchange-control unit 22a will be described later. Accordingly, another input terminal of an AND gate 21f in the arbitration unit $21_1$ is made "0" so as to end the communication with the image processing unit 30a.

The bus license control unit 22 that determines access priority includes the bus-master-exchange-control unit 22a. An output signal of the flipflop 21d in each arbitration unit $21_1$, $21_2$, $21_3$ for the corresponding image processing units 30a, 30b, and 30c, an output signal of the counter 21e, and an output signal of an OR gate 22b are input to the bus license control unit 22. In FIG. 3, S1 is a signal corresponding to the output signal of the flipflop 21d in the arbitration unit $21_2$, for the image processing unit 30b. S2 is a signal corresponding to the output signal of the counter 21e in the arbitration unit $21_2$ that is for the image processing unit 30b. S3 is a signal corresponding to the output signal of the flipflop 21d in the arbitration unit $21_3$ for the image processing unit 30c. S4 is a signal corresponding to the output signal of the counter 21e in the arbitration unit $21_3$ for the image processing unit 30c. The bus-master-exchange-control unit 22a outputs signals S5, S6, and S7. The signal S5 is input to another input terminal of the AND gate 21f in the arbitration unit $21_1$ for the image processing unit 30a. The signal S6 is input to another input terminal of the AND gate 21f in the arbitration unit $21_2$ for the image processing unit 30b. The signal S7 is input to another input terminal of the AND gate 21f in the arbitration unit $21_3$ for the image processing unit 30c.

When "1" is input from the flipflop 21d, "0" is input from the signal S1, "0" is input from the signal S3, "0" is input from the counter 21e, and "1" is input from the OR gate 21b, the bus-master-exchange-control unit 22a outputs "1" at signal S5, "0" at signal S6, and "0" at signal S7, respectively.

When "0" is input from the counter 21e, the signal S2, and the signal S4, respectively, "1" is input from the flipflop 21d, the signal S1, and the signal S3, respectively, and "0" is input from the OR gate 21b. The bus-master-exchange-control unit 22a outputs "1" to one of the signals S5, S6, and S7 that are signals for the arbitration units $21_1$, $21_2$, $21_3$ in accordance with time being measured internally.

More specifically, "1" is output on the signal S5 that corresponds to a clock cycle. Then, a predetermined period later, "1" is output on the signal S6 that corresponds to a following clock cycle. Similarly, "1" is output on the signal S7 that corresponds to the next clock cycle after the following clock cycle. Thus, "1" is output exclusively to one of the signals S5, S6, and S7 in every predetermined period. Once the bus-master-exchange-control unit 22a outputs "1" to one of signals S5, S6, and S7, the bus-master-exchange-control unit 22a returns all "0" only when "1" is input from one of the counter 21e and the signals S2 and S4.

Referring to above described condition and the circuit diagram shown in FIG. 3, when the signal S5 that is an output signal from the bus-master-exchange-control unit 22a is "1", all the signals of the command I/F and the data I/F from the image processing unit 30a are output to the first DRAM controller 10. When the signal S5 is "0", the signals are not output. As for the signals S6 and S7, each arbitration unit 21 performs similarly to signal S5.

The OR gate 22b outputs "1" to the bus-master-exchange-control unit 22a when "1" is received from any one of the register 22c and the NOR gate 22d which receives the command I/F-REQ signal that the image processing unit 30b outputs and a command I/F-REQ signal that the image processing unit 30c outputs.

The register 22c can be set externally. By setting "1" the register 22c, the bus-master-exchange-control unit 22a can output "1" to the signal S5 without referring to the status of the command I/F-REQ signals input in parallel from the other image processing units 30b and 30c. Further, by setting "0" in the register 22c, the bus-master-exchange-control unit 22a outputs "1" exclusively to one of output signals S5, S6, and S7 of the bus-master-exchange-control unit 22a.

Based on the setting value of the register 22c, the bus-master-exchange-control unit 22a switches control mode between a first control mode in which the command I/F-REQ signal input from the image processing units 30 is output as the command I/F-REQ signal to the first DRAM controller 10 in accordance with the time being measured in the bus-master-exchange-control unit and a second control mode in which the command I/F-REQ signal input from the image processing unit 30a is output to the first DRAM controller 10 as the command I/F-REQ signal to the first DRAM controller 10 prior to the command I/F-REQ signals input from the other image processing units 30b and 30c. Consequently, it is possible to switch control mode between the first control mode in which right of access is switched one after another among a plurality of bus masters in a predetermined certain interval and the second control mode in which right of access is given to a particular bus master among a plurality of the bus masters.

Each of the image processing units 30a, 30b, and 30c is a bus master and includes a data processing unit 31, a buffer 32, a buffer control unit 33, a command issue circuit 34, and an image-processing-unit-control unit 35. In this illustrative embodiment, the image processing unit 30a, 30b, and 30c have the same circuit configuration.

The data processing unit 31 performs predetermined processing of data input externally and data (read data from the DRAM 40) input from the second DRAM controller 20 through the data I/F.

The buffer 32 stores data processed in the data processing unit 31. The buffer control unit 33 inputs and outputs the data of the data I/F from the buffer 32, and outputs the REQ signal of data I/F for the second DRAM controller 20. When the second DRAM controller 20 receives the REQ signal, the second DRAM controller 20 receives the ACK signal and cancels outputting the REQ signal for data I/F.

The command issue circuit 34 outputs data (command data) to the command I/F. At the same time, the command issue circuit 34 outputs the REQ signal for the command I/F to the external second DRAM controller 20. When the second DRAM controller 20 accepts the REQ signal, the second DRAM controller 20 receives the ACK signal and cancels output of the REQ signal for the command I/F.

The image-processing-unit-control unit 35 outputs the input data request signal requesting a request to input data to the command issue circuit 34 and external devices.

A latency between when the image-processing-unit-control unit 35 starts to request input data and when the data is output to the data I/F is a sum of a time N and a time M, that is, M+N, where N is a time from when the image processing unit 30 issues the data request to the external devices to when the data is input, and M is a time from when the data processing unit 31 starts to process the data to when the processed data is stored in the buffer 32.

The image-processing-unit-control unit 35 starts to control the command issue circuit 34 immediately when the image-processing-unit-control unit 35 requests to input data. Further, the command issue circuit 34 performs less complex processing than the data processing unit 31 performs.

Accordingly, comparing the latencies, the relation is (M+N)>L, where the latency L is defined as a time L from when the image-processing-unit-control unit 35 starts to request input data to when the data is output to the data I/F. Consequently, the image processing unit 30 is a unit that outputs the REQ signal for the command I/F prior to the REQ signal for the data I/F.

Although in the present illustrative embodiment the image processing unit 30 processes image data, any data processing circuit that satisfies the above-described latency condition with respect to the command I/F and data I/F will do.

The DRAM 40 is a readable and writable semiconductor memory and is used to temporally store the data processed by each of the image processing units 30a, 30b, and 30c.

In the DRAM 40, information is stored by storing a charge. The charge decreases with the passage of time. Accordingly, a rewriting (refresh) operation is required to keep the stored information. The DRAM 40 may be SDRAM, Double-Data-Rate Synchronous Dynamic Random Access Memory (DDR-SDRAM), including Double-Data-Rate2 (DDR2), and DDR3, and can perform a burst access operation.

The image processing system according to the embodiment of the present invention switches operation mode and includes the arbitration unit 21 to output data in accordance with the timing fit for each of the modes. More specifically, the image processing system switches between the first operation mode, in which the data is not output to the first DRAM controller 10 until both the data of the data I/F input and the data of the command I/F from the image processing 30 are input, and the second operation mode, in which the data will be output to the first DRAM controller 10 immediately when the data is input to the command I/F and the data of the data I/F is output when the data is input later from the corresponding data I/F.

When a plurality of the image processing units 30a, 30b, and 30c are accessing, the write access request may be issued when both the data of the command I/F and the data of the data I/F are available. Under such a condition, the command I/F and the data I/F of the first DRAM controller 10 are not occupied while the image processing unit 30 is preparing the data, and it is possible to receive access requests from the other image processing unit 30. Accordingly, a bus transmission efficiency between the image processing units 30 is increased. Consequently, a data transmission efficiency with DRAM is improved.

It is possible to switch the operation mode so that the command execution unit 12 in the first DRAM controller 10 causes the second DRAM controller 20 to immediately output the command input from the command I/F to the first DRAM controller 10. Accordingly, it is possible to compensate for the latency time of the command execution unit 11 by requesting the command I/F from the image processing unit 30 in advance.

In the illustrative embodiment described above, the second DRAM controller 20 switches operation mode between the first operation mode, in which the command I/F-REQ signal is output to the first DRAM controller 10 when both the data of the command I/F and the data of the data I/F are available, and the second operation mode, in which the command I/F-REQ signal is output to the first DRAM controller 10 immediately when the command data of the command I/F becomes available. However, each image processing unit 30 may perform this function. More specifically, each image processing unit 30 may include the AND gate 21a, the OR gate 21b, the register 21c. In other words, the mode setting unit and the timing arbitration unit may be provided in the bus master.

With this configuration, each image processing unit can switch the operation mode between the first operation mode in which the write access request is output to the second DRAM controller 20 when both the data of the command I/F and the data of the data I/F are available and the second operation mode in which the write access request is output to the second DRAM controller 20 immediately when the command data of the command I/F is input.

Consequently, it is possible to select the application depending on the use condition. For example, if the image processing unit 30 does not compete with other image processing units, it is possible to select the second operation mode in which the image processing unit issues a write access request to the second DRAM controller 20 even when both the data of the command I/F and the data of the data I/F are not available. As a result, data transmission efficiency to the DRAM 40 is improved compared to a system in which one set of the mode setting unit and the timing arbitration unit exercises total control of the second DRAM controller 20, because the image processing unit 30 works more simply.

Numerous additional modifications and variations are possible in light of the above teachings. It is therefore to be understood, that within the scope of the appended claims, the disclosure of this patent specification may be practiced otherwise than as specifically described herein.

What is claimed is:

1. A memory access controller comprising:
   a command analysis unit configured to receive write access requests for a memory and command data from a plurality of bus masters to analyze access to the memory;
   a command execution unit configured to output a command control signal and a data control signal to the memory based on write data input from the plurality of bus masters and an analysis result provided by the command analysis unit;
   a mode setting unit configured to switch operation mode between a first operation mode in which a write access request from a bus master is issued to the command analysis unit when both the command data and the corresponding write data are available and a second operation mode in which a write access request from a bus master is issued to the command analysis unit when the command data is available independently of availability of the write data corresponding to the command data; and
   a timing arbitration unit provided for each bus master and configured to output the write access request and command data to the command analysis unit and output the write data to the command execution unit at a timing fit for the mode set by the mode setting unit.

2. The memory access controller according to claim 1, further including an access priority setting unit to determine an access priority when the plurality of the bus masters send write access requests to the memory, wherein right of access is given sequentially to one of the plurality of the bus masters at a predetermined time interval.

3. The memory access controller according to claim 2, wherein the access priority setting unit provides right of access to a specific bus master among the plurality of the bus masters.

4. The memory access controller according to claim 1, wherein at least one of the plurality of bus masters outputs the command data prior to the write data.

5. A memory access system comprising:
   a plurality of bus masters;
   a command analysis unit configured to receive write access requests for a memory and command data from the plurality of bus masters and analyze access to the memory;
   a command execution unit configured to output a command control signal and a data control signal to the memory based on write data input from the plurality of bus masters and an analysis result provided by the command analysis unit;
   a mode setting unit provided in each one of the bus masters and configured to switch operation mode between a first mode in which a write access request is issued to the command analysis unit when both the command data and the corresponding write data are available and a second mode in which a write access request is issued to the command analysis unit when the command data is available independently of availability of the write data corresponding to the command data; and
   a timing arbitration unit provided in each one of bus masters and configured to output the write access request and the command data and the write data in accordance with the mode setting unit.

6. A method of controlling memory comprising the steps of:
   receiving write access requests for a memory and command data from a plurality of bus masters;
   analyzing access to a memory based on the command data; and
   outputting a command control signal and a data control signal to the memory based on write data input from the plurality of bus masters, and the analysis result provided by the command analysis unit,
   wherein an operation mode is switched between a first mode in which a write access request from at least one of the plurality of bus masters is issued to the memory control unit when both the command data and the corresponding write data are available, and a second mode in which a write access request from at least one of the plurality of bus masters is issued to the memory control unit when the command data is available independently of availability of the write data corresponding to the command data, and
   wherein the write access request from the bus master, the command data and the write data are output to the command execution unit at a timing set by the mode setting unit.

* * * * *